US012596937B2

(12) United States Patent
Chen

(10) Patent No.: US 12,596,937 B2
(45) Date of Patent: Apr. 7, 2026

(54) METHOD AND APPARATUS FOR ADAPTING MACHINE LEARNING TO CHANGES IN USER INTEREST

(71) Applicant: AT&T Intellectual Property I, L.P., Atlanta, GA (US)

(72) Inventor: Min-Hsuan Chen, Colts Neck, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1356 days.

(21) Appl. No.: 17/217,810

(22) Filed: Mar. 30, 2021

(65) Prior Publication Data

US 2022/0318649 A1 Oct. 6, 2022

(51) Int. Cl.
 *G06N 5/04* (2023.01)
 *G06N 20/00* (2019.01)
(52) U.S. Cl.
 CPC .............. *G06N 5/04* (2013.01); *G06N 20/00* (2019.01)
(58) Field of Classification Search
 CPC .................................. G06N 5/04; G06N 20/00
 See application file for complete search history.

(56) References Cited

PUBLICATIONS

Gan, Mingxin, and Hongfei Cui. "Exploring user movie interest space: A deep learning based dynamic recommendation model." Expert Systems with Applications 173 (Feb. 11, 2021): 114695. (Year: 2021).*

Xia, Chaolun, et al. "Dynamic item-based recommendation algorithm with time decay." 2010 Sixth International Conference on Natural Computation. vol. 1. IEEE, 2010. (Year: 2010).*
Chen, M-H. "A notion for machine learning: knowledge developability." [1988] Proceedings of the Twenty-First Annual Hawaii International Conference on System Sciences. vol. III: Decision Support and Knowledge Based Systems Track. vol. 3. IEEE, 1988. (Year: 1988).*
Chen, Min-Hsuan, "A Notion for Machine Learning: Knowledge Developability", Proceedings of the 21st Hawaii International Conference on System Sciences, Jan. 5-8, 1988, 6 pages.
Lau, Saki, "Learning Rate Schedules and Adaptive Learning Rate Methods for Deep Learning", Towards Data Science, Jul. 29, 2017, 18 pages.

(Continued)

*Primary Examiner* — Casey R. Garner
(74) *Attorney, Agent, or Firm* — Guntin & Gust, PLC; Dana LeMoine

(57) ABSTRACT

Aspects of the subject disclosure may include, for example, assigning a first interest measure associated with a first input to a learning machine at a first cycle, determining a first intelligence level according to a first product of the first interest measure and a first performance level based on the first input, and responsive to receiving a subsequent input at a subsequent cycle, reducing the first interest measure associated with the first input at the first cycle of the learning machine according to a total number of cycles that have occurred since the first cycle, assigning a new interest measure to the subsequent input at the subsequent cycle, generating a subsequent performance level according to the subsequent input, and determining a subsequent intelligence level according to a second product of the subsequent interest level and a subsequent performance level. Other embodiments are disclosed.

20 Claims, 14 Drawing Sheets

(56)        References Cited

PUBLICATIONS

Widyantoro, Dwi H. et al., "Learning User Interest Dynamics With a Three-Descriptor Representation", To Appear in the Journal of the American Society for Information Science (JASIS), Dec. 2000, 52 pages.
Zhao, Yang, "Based On User Interest Level of Modeling Scenarios and Browse Content", AIP Conference Proceedings, Aug. 3, 2017, 5 pages.

* cited by examiner

100

200

210

220

230

235

240

245

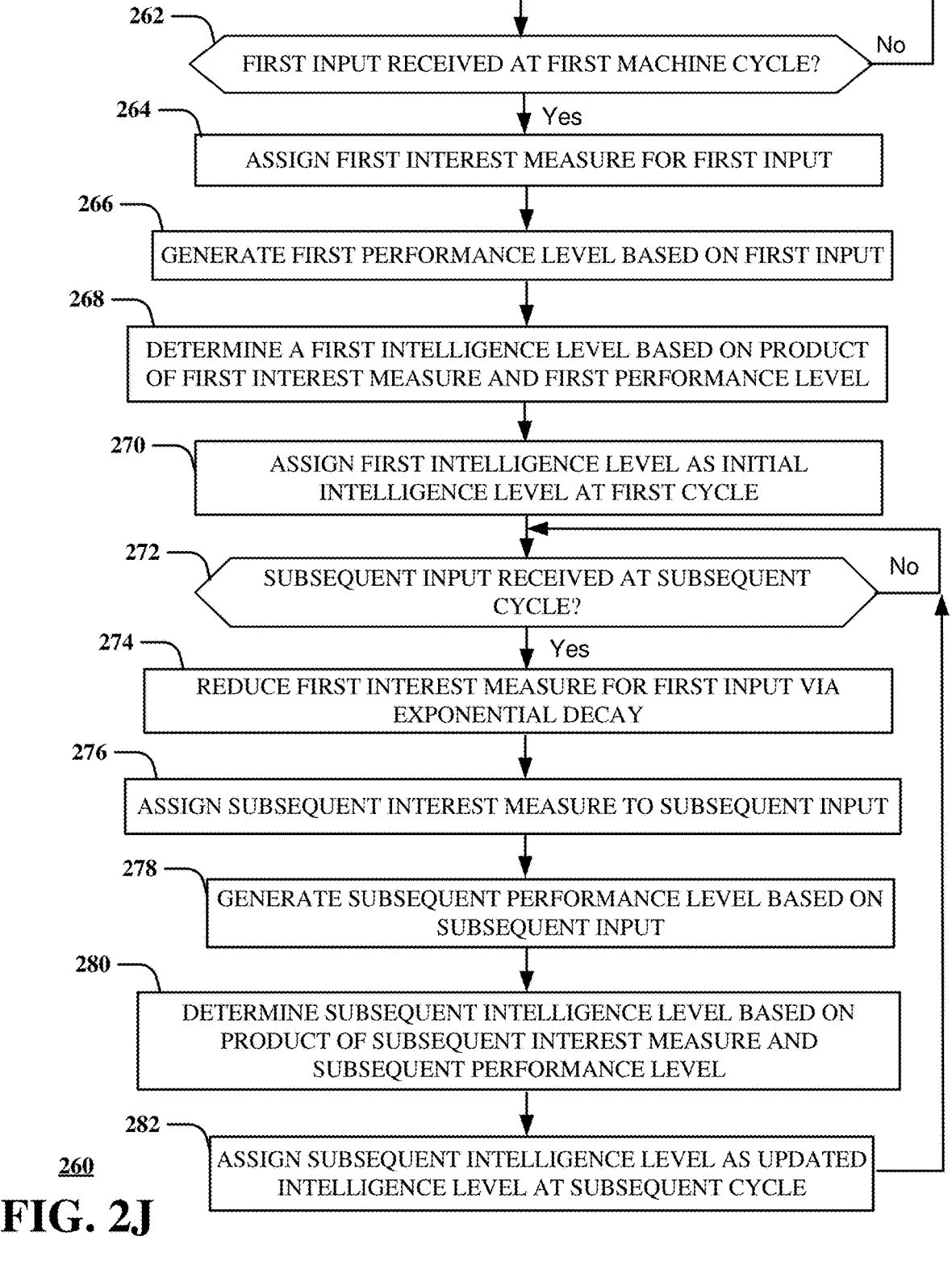

262 — FIRST INPUT RECEIVED AT FIRST MACHINE CYCLE?     No

264 — Yes
ASSIGN FIRST INTEREST MEASURE FOR FIRST INPUT

266 — GENERATE FIRST PERFORMANCE LEVEL BASED ON FIRST INPUT

268 — DETERMINE A FIRST INTELLIGENCE LEVEL BASED ON PRODUCT OF FIRST INTEREST MEASURE AND FIRST PERFORMANCE LEVEL

270 — ASSIGN FIRST INTELLIGENCE LEVEL AS INITIAL INTELLIGENCE LEVEL AT FIRST CYCLE

272 — SUBSEQUENT INPUT RECEIVED AT SUBSEQUENT CYCLE?     No

274 — Yes
REDUCE FIRST INTEREST MEASURE FOR FIRST INPUT VIA EXPONENTIAL DECAY

276 — ASSIGN SUBSEQUENT INTEREST MEASURE TO SUBSEQUENT INPUT

278 — GENERATE SUBSEQUENT PERFORMANCE LEVEL BASED ON SUBSEQUENT INPUT

280 — DETERMINE SUBSEQUENT INTELLIGENCE LEVEL BASED ON PRODUCT OF SUBSEQUENT INTEREST MEASURE AND SUBSEQUENT PERFORMANCE LEVEL

282 — ASSIGN SUBSEQUENT INTELLIGENCE LEVEL AS UPDATED INTELLIGENCE LEVEL AT SUBSEQUENT CYCLE

METHOD AND APPARATUS FOR ADAPTING MACHINE LEARNING TO CHANGES IN USER INTEREST

FIELD OF THE DISCLOSURE

The subject disclosure relates to a method and apparatus for adapting machine learning to changes in user interest.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein:

FIG. 2J depicts an illustrative embodiment of a method in accordance with various aspects described herein.

DETAILED DESCRIPTION

Figure 1:
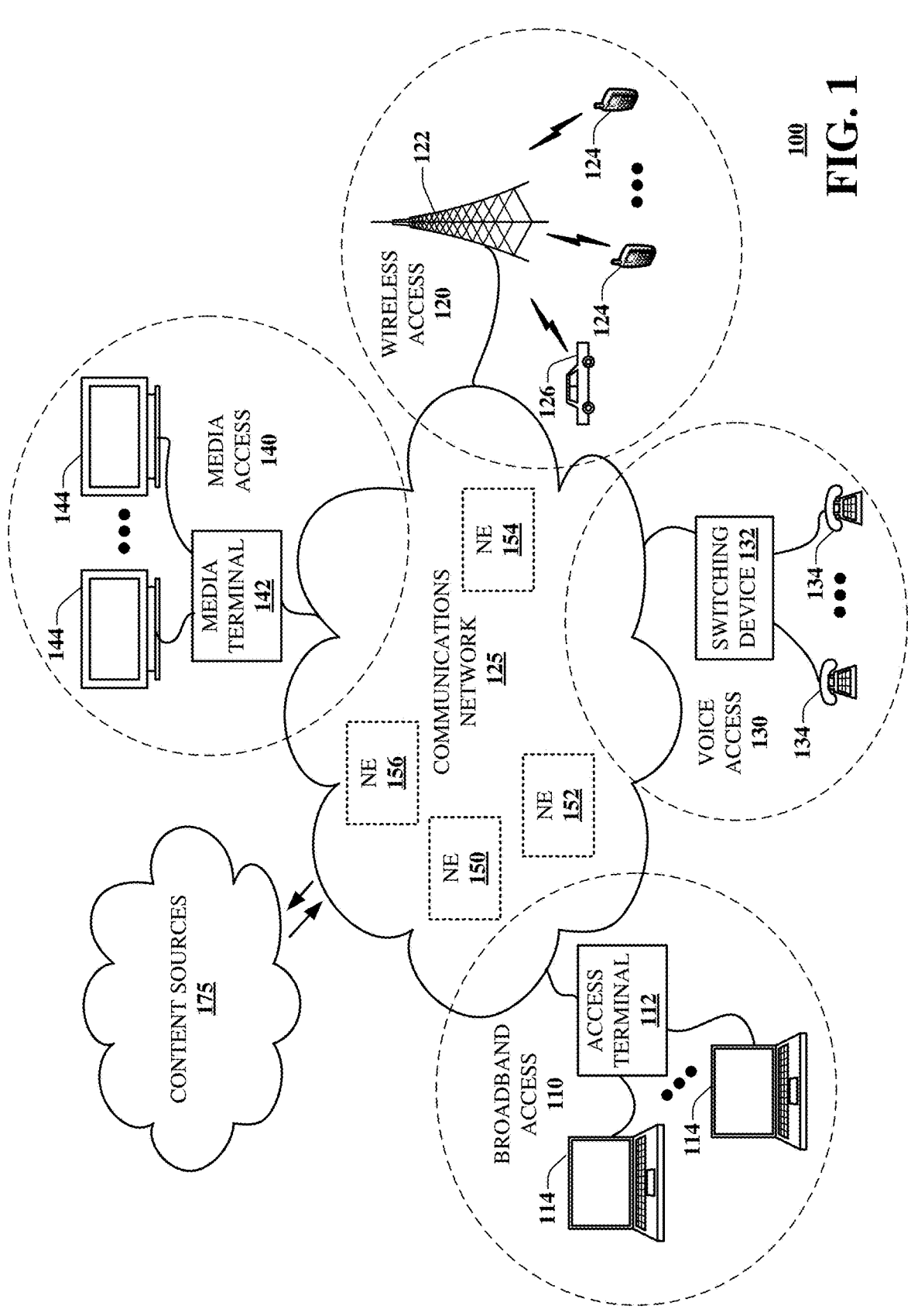
FIG. 1 is a block diagram illustrating an exemplary, non-limiting embodiment of a communications network in accordance with various aspects described herein.

The subject disclosure describes, among other things, illustrative embodiments for providing a learning machine capable of adapting to changes in input interest. An input, such as a training input, to a learning machine can be captured and assigned an interest measure. A performance level can be generated by the learning machine based on the input. An intelligence level for the learning machine can be determined based on a product of the performance level and the input interest measure. The interest level for the input can then be degraded, over subsequent input/cycles of the learning machine, using an exponential decay model. The exponential decay can be tailored to enable the learning machine to both retain a measure of the original intelligence level over a substantial number of machine cycles and to quickly respond to changes in input patterns. Other embodiments are described in the subject disclosure.

One or more aspects of the subject disclosure include a method performed by a learning machine including a processor. Responsive to receiving a first input at a first cycle of a learning machine, the method can include assigning a first interest measure associated with the first input, and, in turn, generating a first performance level of the learning machine according to the first input to the learning machine. The method can also include determining a first intelligence level of the learning machine according to a first product of the first interest measure and the first performance level, and, in turn, assigning the first intelligence level as an initial intelligence level for the learning machine and the first cycle as a machine cycle at the initial intelligence level for the learning machine. The learning machine can be adapted to substantially optimize intelligence level. Responsive to receiving a subsequent input at a subsequent cycle of the learning machine, the method can further include reducing the first interest measure associated with the first input at the first cycle of the learning machine according to a total number of cycles of the learning machine that have occurred since the first cycle. The method can include assigning a new interest measure to the subsequent input at the subsequent cycle of the learning machine, and, in turn, generating a subsequent performance level of the learning machine according to the subsequent input to the learning machine. The method can also include determining a subsequent intelligence level of the learning machine according to a second product of the subsequent interest level and the subsequent performance level.

One or more aspects of the subject disclosure include A learning machine, including a processing system including a processor and a memory that stores executable instructions that, when executed by the processing system, facilitate performance of operations. The operations can include assigning a first interest measure associated with a first input to the learning machine at a first cycle of the learning machine, and, in turn, generating, a first performance level of the learning machine according to the first input to the learning machine. The operations can also include determining a first intelligence level of the learning machine according to a first product of the first interest measure and the first performance level. The learning machine can be adapted to substantially optimize intelligence level. Responsive to receiving a subsequent input at a subsequent cycle of the learning machine, the operations can include reducing the first interest measure associated with the first input at the first cycle of the learning machine according to a total number of cycles of the learning machine that have occurred since the first cycle. The operations can also include assigning a new interest measure to the subsequent input at the subsequent cycle of the learning machine. The operations can further include generating a subsequent performance level of the learning machine according to the subsequent input to the learning machine, and, in turn, determining a subsequent intelligence level of the learning machine according to a second product of the subsequent interest level and the subsequent performance level.

One or more aspects of the subject disclosure include a non-transitory machine-readable medium, comprising executable instructions that, when executed by a processing system including a processor, facilitate performance of operations at a learning machine. The operations can include assigning a first interest measure associated with a first input to the learning machine at a first cycle of the learning machine and, in turn, generating a first performance level of the learning machine according to the first input to the learning machine. The operations can also include determining a first intelligence level of the learning machine according to a first product of the first interest measure and a first performance level of the learning machine based on the first input to the learning machine. The learning machine can be adapted to substantially optimize intelligence level. Responsive to receiving a subsequent input at a subsequent cycle of the learning machine, the operations can further include reducing the first interest measure associated with the first input at the first cycle of the learning machine according to a total number of cycles of the learning machine that have occurred since the first cycle. The operations can include assigning a new interest measure to the subsequent input at the subsequent cycle of the learning machine. The operations can also include generating a subsequent performance level of the learning machine according to the subsequent input to the learning machine, and, in turn, determining a subsequent intelligence level of the learning machine according to a second product of the subsequent interest level and a subsequent performance level of the learning machine based on the subsequent input to the learning machine.

Referring now to FIG. 1, a block diagram is shown illustrating an example, non-limiting embodiment of a system 100 in accordance with various aspects described herein. For example, system 100 can facilitate in whole or in part providing a learning machine capable of adapting to changes in input interest. An input, such as a training input, to a learning machine can be captured and assigned an interest measure. A performance level can be generated by the learning machine based on the input. An intelligence level for the learning machine can be determined based on a product of the performance level and the input interest measure. The interest level for the input can then be degraded, over subsequent input/cycles of the learning machine, using an exponential decay model. The exponential decay can be tailored to enable the learning machine to both retain a measure of the original intelligence level over a substantial number of machine cycles and to quickly respond to changes in input patterns.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
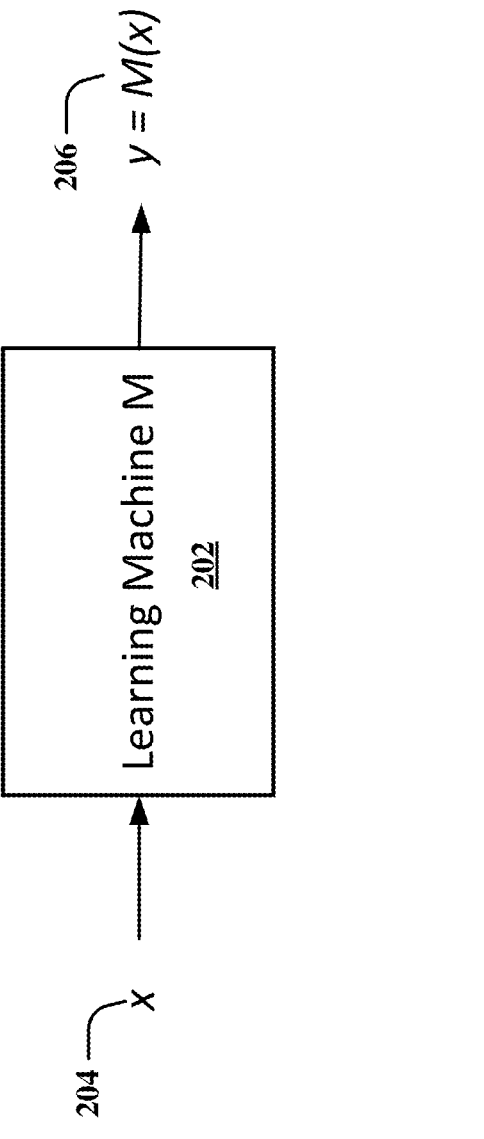
FIG. 2A is a block diagram illustrating an example, non-limiting embodiment of a system functioning within the communication network of FIG. 1 to provide a learning machine capable of adapting to input interest in accordance with various aspects described herein.

FIG. 2A is a block diagram illustrating an example, non-limiting embodiment of a system functioning within the communication network of FIG. 1 to provide a learning machine capable of adapting to input interest in accordance with various aspects described herein. In one or more embodiments, a system 200 can facilitate providing a learning machine 202 capable of adapting to changes in input interest. An input x 204, such as a training input, to the learning machine 202 can be captured and assigned an interest measure. A performance level y=M(x) 206 can be generated by the learning machine 202 based on the input x 204. An intelligence level for the learning machine can be determined based on a product of the performance level 206 and the input interest measure. The interest level for the input 204 can then be degraded, over subsequent input/ cycles of the learning machine, using an exponential decay model. The exponential decay can be tailored to enable the learning machine 202 to both retain a measure of the original intelligence level over a substantial number of machine cycles and to quickly respond to changes in input patterns.

In one or more embodiments, an intelligence level can be formulated for a learning machine 202. The intelligence level can be based on a probability model of user's interest in an input 204. This intelligence level can be optimized by the learning machine 202, and this optimization can be a learning objective of a learning machine 202. In this way, the learning machine 202 can respond and adapt to changes in a user's interest. In one or more embodiments, an interest measure for an input 204 to the learning machine 202 can be computed. This interest measure can be independent of the design of a learning machine 204.

In one or more embodiments, a user's interest in an input 204 to a learning machine 202 can be defined as a finite resource, which can be allocated to different input variations over the life cycle of the learning machine 202. This finiteness of user interest can be a key design element of an adaptive learning machine 202.

In one or more embodiments, the interest measure can include a global layer and a local layer. The global interest model can be intended to remain unchanged (or minimally changed) throughout the life cycle of the learning machine 202. The local interest measure can be specific to an individual user input instances or to sets of input instances. By selecting and/or modifying an interest measure, the adaptivity or the breadth of machine learning focus can be enhanced without modifying currently proven designs for deep-learning machines, notably artificial neural networks.

In one or more embodiments, an input instance x 204 to a learning machine M 202 can be assumed to cause the learning machine 204 to produces a unique output instance y 206, where y=M(x). The quality of the output instance y 206 can be assessed by assigning to it a numeric value, denoted by $\lambda(x, y)$. This value can quantify a performance level with respect to the input instance x 204 and its corresponding output instance y=M(x) 206. Without ambiguity, the notation M can be interchangeably used to designate both as the learning machine 202, itself, as well as a mathematical function M(x) that maps an input instance x 204 to an output instance y 206 that the learning machine 202 produces.

In one or more embodiments, to assess an overall intelligence level of a learning machine 202, the performance levels y=M(x) 206 can be summed over all possible input instances of x 204. However, the input instances x 204 can be weighted by a discriminating mechanism to account for different degrees of interest. That is, some input instances of x 204 are more interesting or important than others. A probability $\mu$ can exist on the space of all possible input instances, $I^*$. A particular input instance i can have a probability $\mu(i)$ that denotes and corresponds to an interest measure of i. By definition, for such of probability $\mu(i)$, $$\sum_{i \in I^*} \mu(i) = 1, \text{ where } 0 \le \mu(i) \le 1, \text{ for each } i \in I^*$$

where the input instances i can be either from users or from an environment or from both.

In one or more embodiments, an intelligence level A, for a learning machine 202 can be defined as the sum of the product of each performance level and each interest measure for each input instance across the space of all possible input instances, as shown by $$\Lambda(M) = \sum_{i \in I^*} \lambda(i, M(i)) \mu(i)$$

The above equation can be normalized with an assumption that the performance levels are always greater than or equal to 0 and less than or equal to one. That is, $$0 \le \lambda(i, M(i)) \le 1, \text{ for each } i \in I^*.$$

As a result, $$0 \le \Lambda(M) \le 1, \text{ for any machine } M.$$

Therefore, given a machine M, the intelligence level with respect to an input instance, i, can be defined as $$\lambda(i, M(i)) \mu(i).$$

In one or more embodiments, mathematically, probability can be a special case of measure. The terms interest, significance, priority and importance can be different interpretations of the same interest measure, $\mu$. Performance level and intelligence level can be distinguished. For example, the performance level may not take the input interest measure into account. However, the intelligence level can incorporate both the performance level and the input's interest measure. Hence, $\lambda(i, M(i))$ can be the performance level with respect to input instance i, whereas $\lambda(i, M(i)) \mu(i)$ can be the intelligence level with respect to input instance i.

In one or more embodiments, by way of exemplary example, consider a "chat" room, where team members are trying to figure out why a critical distributed denial-of-service (DDOS) attack event is not showing up in a network surveillance dashboard that is under the control of a learning machine. A traditional DDOS attack can follow a pattern, where the attack exhibits a ramp-up time until reaching peak and, subsequently, a trailing off. However, the exemplary DDOS event can exhibit a new pattern, where there are repeated intervals of intensity, from zero to maximum value, occurring over very short time intervals. In this scenario, a learning machine 202, as a team member, may fail to properly detect the DDOS event due to the new attack pattern deviating substantially from the traditional and expected pattern. As a result, the observed intelligence level of the learning machine 202 can be degraded by the presence of this new attack pattern and the failure to detect the event. However, after learning the new attack pattern, the learning machine 202 can begin to improve its intelligence level.

In one or more embodiments, a model of interest measure can be used with a learning machine 202 such that the interest level of an input instance 204 can degrade over time. For example, an exponential decay model can be adopted. A simple method for computing a currently effective interest level of a previously received input instance can be based on an originally given interest level and on an elapsed machine cycle count. A global-level user interest and local-level interest can be used. A scale (or size or magnitude) of a learning machine 202 can be defined in terms of a volume of learned input instances that the learning machine 202 should retain in order to maintain an optimized intelligence level as a learning objective, while also maintaining an ability to learn from new input patterns. A method for choosing a specific global-level interest model parameter can be based on a given desirable level of scale of the learning machine 202.

Figure 2B:
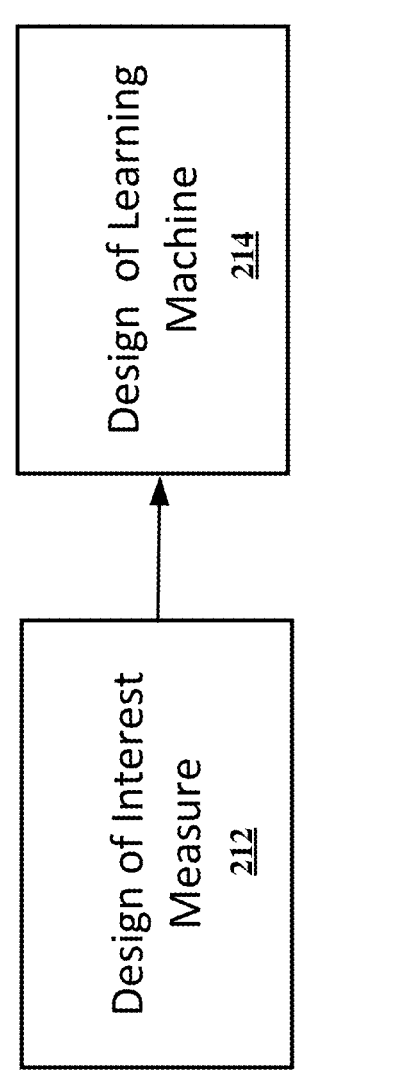
FIG. 2B is a block diagram illustrating an example, non-limiting embodiment of a system with independent designs of input interest measure and learning machine in accordance with various aspects described herein.

FIG. 2B is a block diagram illustrating an example, non-limiting embodiment of a system 210 with independent designs of input interest measure and learning machine in accordance with various aspects described herein. In one or more embodiments, a design for manipulating an interest measure of input 212 and a design for a learning machine 214 can be independent. The interest measure design 212 can provide a residual of an input over many machine cycles while also providing an opportunity for the learning machine to quickly learn a new input pattern. The learning machine design 214 can optimize an intelligence level as a learning objective. In contrast, many existing ideas for enhancing the adaptivity or the breadth in machine learning focus on modifying currently proven designs of deep-learning machines, notably artificial neural networks. Many adaptive algorithms are adaptive or have adaptive variants, which typically employ automatic adjustment of algorithm parameters according to optimization statistics (e.g., rate of convergence). However, these algorithms do not independently consider properties of user input interest.

Figure 2C:
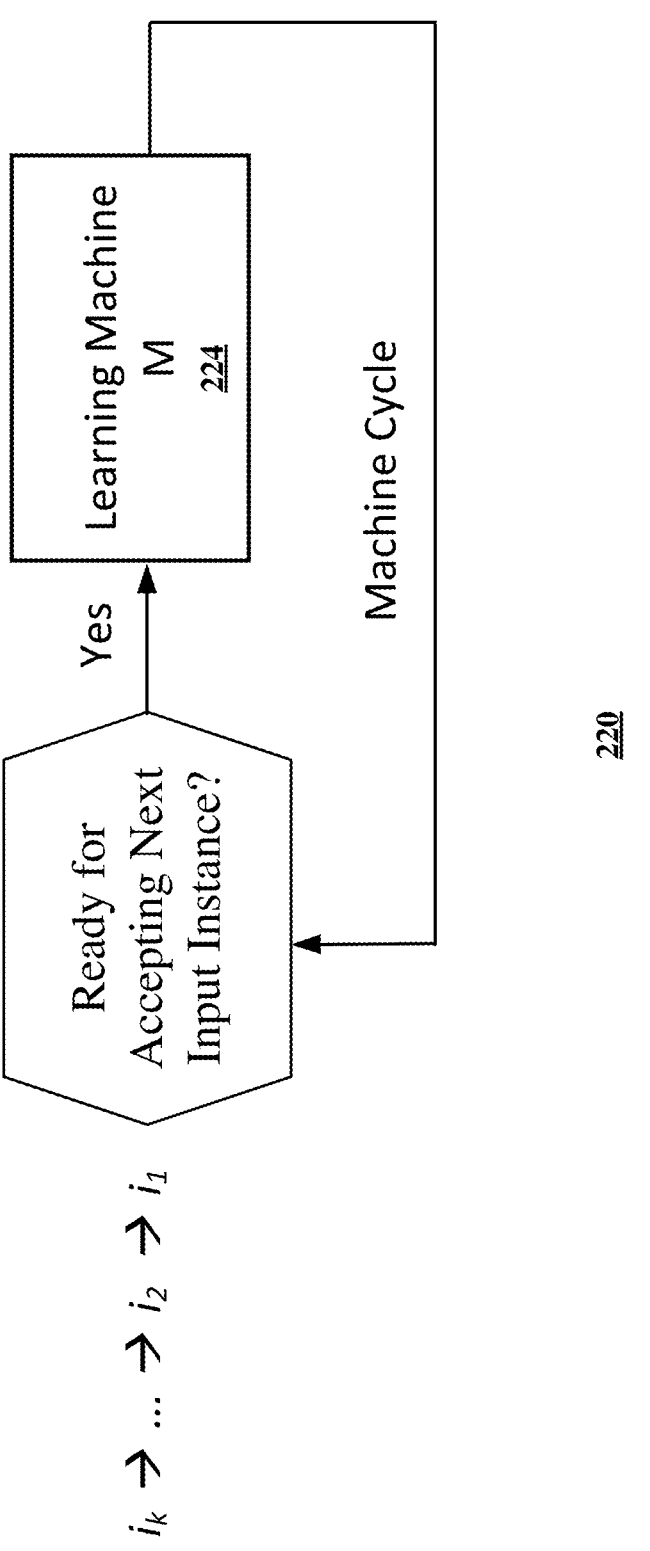
FIG. 2C is a block diagram illustrating an example, non-limiting embodiment of a design of a learning machine utilizing an input interest measure based on an exponential decay model in accordance with various aspects described herein.

FIG. 2C is a block diagram illustrating an example, non-limiting embodiment of a design 220 of a learning machine utilizing an input interest measure based on an exponential decay model in accordance with various aspects described herein. In one or more embodiments, the interest measure can be based on an exponential decay model. For example, learning machine M 224 can receive a sequence of inputs, $i_1, i_2, \ldots i_k$. The input instances arrive in a sequence such that the k-th input instance will not enter the learning machine M 224 until after the previous input instance (k−1)-th enters. A machine cycle can then be defined to begin with an input instance entering the learning machine M 224 and to end at the time when the learning machine M 224 can be ready to accept the next input instance.

In one or more embodiments, the input instances can arrive in a sequence $i_1, i_2, \ldots i_k$. Upon the arrival of each k-th input instance, the learning machine M 224 can be configured to always allocate a fixed, maximum available interest measure (MAIM) for $i_k$. The MAIM can be allocated as a portion of the entire interest probability space of the interest measure, which is defined as being equal to 1. The fixed MAIM value can be denoted as c and is independent of the input instance $i_k$. As a result, upon the arrival of input instance $i_k$, all the previously allocated interested measures are proportionally squeezed into the remaining space of the interest measure, which can have a value of 1−c.

Figure 2D:
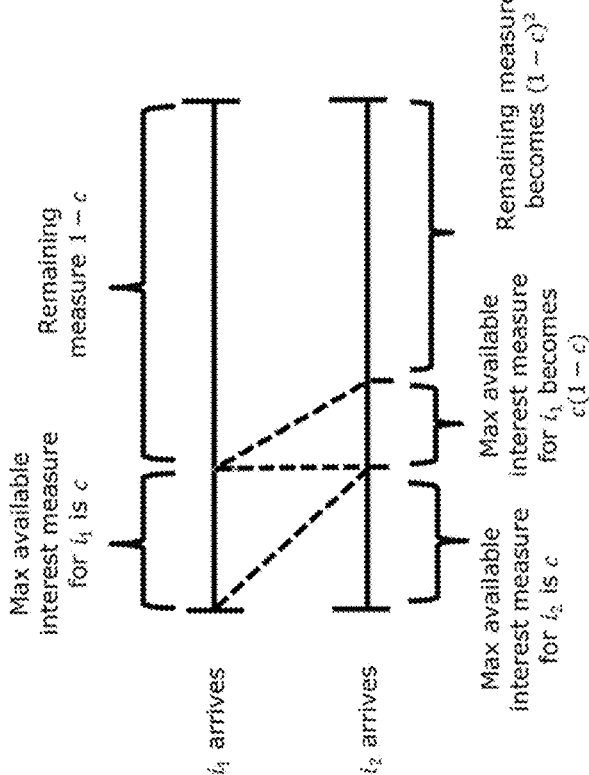
FIG. 2D is a graph illustrating an example, non-limiting embodiment of applying a Maximum Available Interest Measure (MAIM) to a first input instance and a second input instance of a learning machine in accordance with various aspects described herein.

FIG. 2D is a graph illustrating an example, non-limiting embodiment 230 of applying a Maximum Available Interest Measure (MAIM) to a first input instance and a second input instance of a learning machine in accordance with various aspects described herein. In one or more embodiments, upon the arrival of a first input instance $i_1$, the MAIM for $i_1$ can be set to c, leaving the remaining interest measure of 1−c as yet unused. Upon the subsequent arrival of a second input instance $i_2$, the MAIM for $i_2$ can likewise be set to c. However, the MAIM for it can be reduced from c to c(1−c). The unused interest measure can then become $(1-c)^2$. Upon the arrival of the k-th input instance $i_k$, the MAIM of any previous input instance $i_j$ can be $c(1-c)^{k-j}$, where $1 \leq j < k$. In other words, with respect to machine cycle k, the maximum available interest measure of a previous input instance $i_j$ can be $c(1-c)^{k-j}$.

In one or more embodiments, MAIM can be an exponential decay constant for the exponential decay model that is applied to the input interest measure. The exponential decay model can be significant because the model can always allocate a greater interest measure for an upcoming input instance than those for previous input instances. Prioritizing new input interest measures over interest measures of prior inputs can be a key design element for a machine to adapt to changes in new environments.

In one or more embodiments, each input instance can be associated with a degree of interest from a user's point of view. This user-based interest can be called user local interest and can be represented by ε, which can be further represented by a percentage of MAIM. The user local interest can be $0 \leq \varepsilon \leq 1$. For example, 0% and 100% may be interpreted as least important local user interest and most important local user interest, respectively. Upon arrival of the k-th input instance $i_k$, the user interest with respect to the entire interest measure space can become $\varepsilon_k c$. Nevertheless, user local interest, by itself, can be specific to an input instance.

In one or more embodiments, user local interest can be provided by a user to a learning machine in any of several ways. For example, a user can be allowed to specify a user local interest explicitly, possibly with a default value in case the user chooses not to specify. In another example, event severity categories like critical, major, minor can be quantitatively converted into user local interest values. In another example, the inclusion, by a user, of an exclamation mark at the end of a sentence may be converted into a higher value of user local interest. In another example, the inclusion of a joke emoji (e.g., a winking face) may be interpreted as a relatively low value of user local interest.

In one or more embodiments, given a machine, an interest measure on the space of input instances can be designed with a global layer and a local layer. While the local layer can be short term, the global layer of input interest can be long term in character. Parameters in defining a global layer can tend to be unchanged throughout the learning machine's life cycle. Parameters in defining a local layer can tend to be specific to individual input instances or to sets of individual instances. One example of a global parameter is the maximum available interest measure (MAIM).

In one or more embodiments, an effective interest measure can be computed. It can be assumed that a j-th input instance $i_j$ to a learning machine, with a user local interest $\varepsilon_j$, has previously arrived. Upon the arrival of a subsequent input instance $i_k$, where j<k, the user interest of $i_j$ with respect to the entire interest measure space can now become $\varepsilon_j c(1-c)^{k-j}$. An effective interest measure of this j-th input instance at the arrival time of the k-th input instance can be defined as:

$$\text{EffectiveInterestMeasure}_j = \varepsilon_j c(1-c)^{k-j}$$

In some circumstances, the following natural logarithmic form can reduce computational complexity:

$$\ln(\text{EffectiveInterestMeasure}_j) = \ln(\varepsilon_j) + \ln(c) + (k-j) \times \ln(1-c)$$

To summarize, formulas for computing effective interest measures can use MAIM as a global layer and a local user interest as local layer.

In one or more embodiments, MAIM can be intended to remain unchanged throughout a learning machine's life cycle. The value of MAIM can be selected based on a scale a client decides the learning machine should be capable of supporting throughout its life cycle. Optimization of intelligence level can be considered a learning objective. An objective function, as shown below, could be a linear sum over an effective interest measure $\mu$ and a performance level function $\lambda$.

$$Max\left\{\sum_{i \in I^*} \lambda(i, M(i)) \mu(i)\right\}$$

An effective interest measure can be an exponential function of machine cycle. If the MAIM chosen is relatively large, the effective interest measure can shrink drastically. In such a case, early input instances might become too small to contribute meaningfully to the outcome of the objective function. Alternatively, if a relatively small MAIM is chosen, the effective interest measure can end up behaving like a uniform distribution.

In one or more embodiments, two different models for realizing interest measure $\mu$ as used above. Assume a goal is to maintain the most recent 10,000 input instances to contribute meaningfully to an objective function if the learning machine. In a first model, a uniform distribution can be adopted for the interest measure $\mu$ and this uniform distribution can cover only the most recent 10,000 input instances. The effective interest measure of each of the most recent 10,000 input instances is 0.0001. Any input instance older than 10,000 machine cycles will be considered zero interest and, therefore, can be discarded. In such a uniform distribution case, $\mu$ can be the interest measure as well as the effective interest measure. In a second model, an exponential decay model can be adopted with MAIM=0.0001. The effective measure is, again, as shown as:

$$\text{EffectiveInterestMeasure}_j = \varepsilon_j c(1-c)^{k-j}$$

Figure 2E:
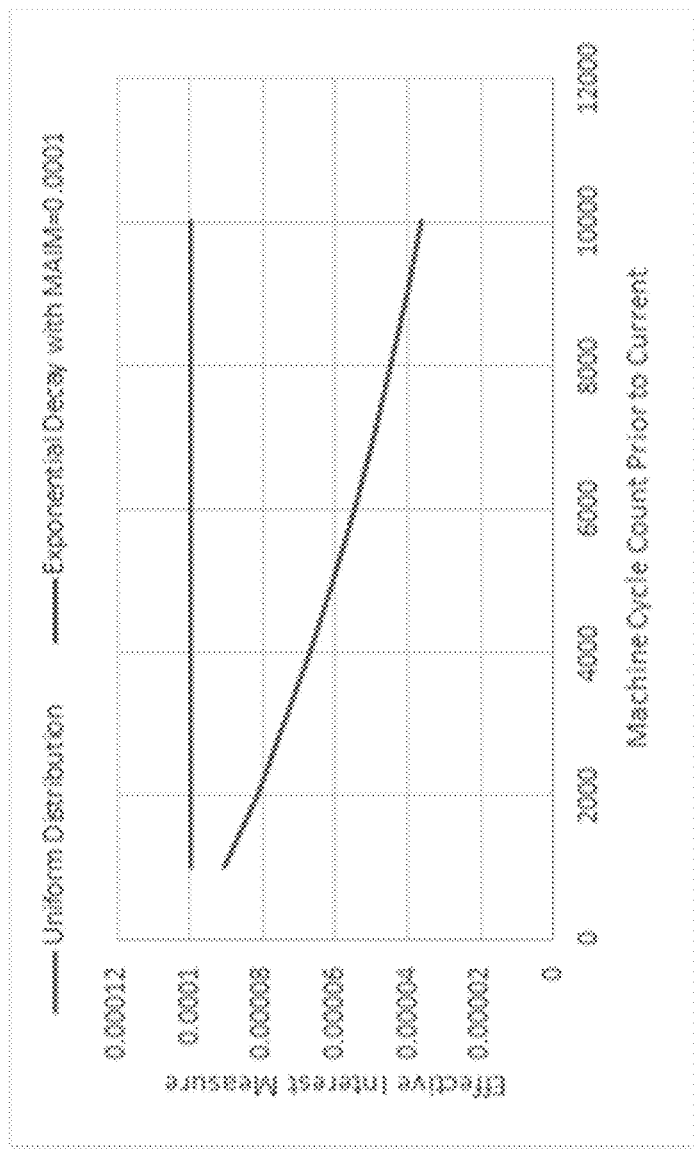
FIG. 2E is a graph illustrating an example, non-limiting embodiment of application of an Exponential Decay Model to Input Interest Measures of a learning machine in accordance with various aspects described herein.

FIG. 2E is a graph illustrating an example, non-limiting embodiment 235 of application of an Exponential Decay Model to Input Interest Measures of a learning machine in accordance with various aspects described herein. In particular, the two models of the effective interest measures are shown. The uniform distribution can be seen as inappropriate for adaptive learning, since this distribution does not give priority to new input instances. Adopting a uniform distribution as an effective interest measure could result in a stubborn, hard-to-change attitude of a machine. By contrast, the exponential decay model can provide an effective interest measure that is responsive to changes in input patterns. As the machine cycle count prior to the current count reaches 10,000, the effective interest measure of the exponential decay model with MAIM=0.0001 is approximately 0.0000368, which is 36.8% of that of the uniform distribution model. Further, the effective interest measure of any of the most recent 10,000 input instances is always above 36.8% of that of the uniform distribution. The value of $\mu$ is always between 0.0001 and 0.0000368.

In one or more embodiments, in the exponential decay model with MAIM=0.0001, the effective interest measure beyond machine cycle count 10,000 can be understood by adding the following assumptions to effective interest measure equation. Assuming that j=0, and $\varepsilon_j$=1, where j=0, the effective interest measure can become:

$$\text{EffectiveInterestMeasure}_j = c \times (1-c)^k$$

As shown in Table 1 below, at machine cycle count k=$10^5$, the effective interest measure can be $4.53772 \times 10^{-9}$. At k=$10^6$, the effective interest measure can be $3.70152 \times 10^{-48}$, which is undoubtedly negligible.

TABLE 1

| Effective Interest Measures for Exponent Decay Model with MAIM = $10^{-4}$ | | | | |
|---|---|---|---|---|
| Machine Cycle Count Prior to Current | | | | |
| $10^2$ | $10^3$ | $10^4$ | $10^5$ | $10^6$ |
| MAIM c = $10^{-4}$ | | | | |
| $9.90049 \times 10^{-5}$ | $9.05 \times 10^{-5}$ | $3.67861 \times 10^{-5}$ | $4.53772 \times 10^{-9}$ | $3.70152 \times 10^{-48}$ |

Figure 2F:
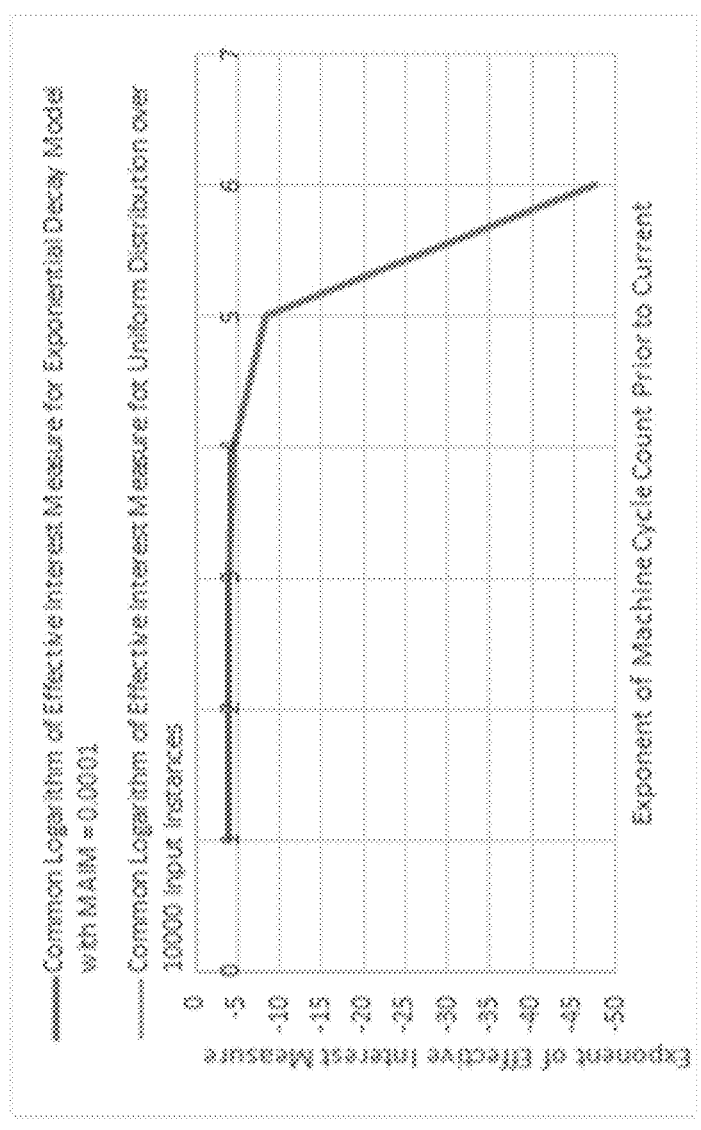
FIG. 2F is a graph illustrating an example, non-limiting embodiment of a Common Logarithm of application of an Exponential Decay Model to Input Interest Measures of a learning machine in accordance with various aspects described herein.

Table 1: Effective Interest Measures for Exponent Decay Model with MAIM=$10^{-4}$ FIG. 2F is a graph illustrating an example, non-limiting embodiment 240 of a Common Logarithm of application of an Exponential Decay Model to Input Interest Measures of a learning machine in accordance with various aspects described herein. In one or more embodiments, a common logarithm can be applied to the effective interest measure, which can clearly demonstrate a sharp cliff pattern in the curve.

Figure 2G:
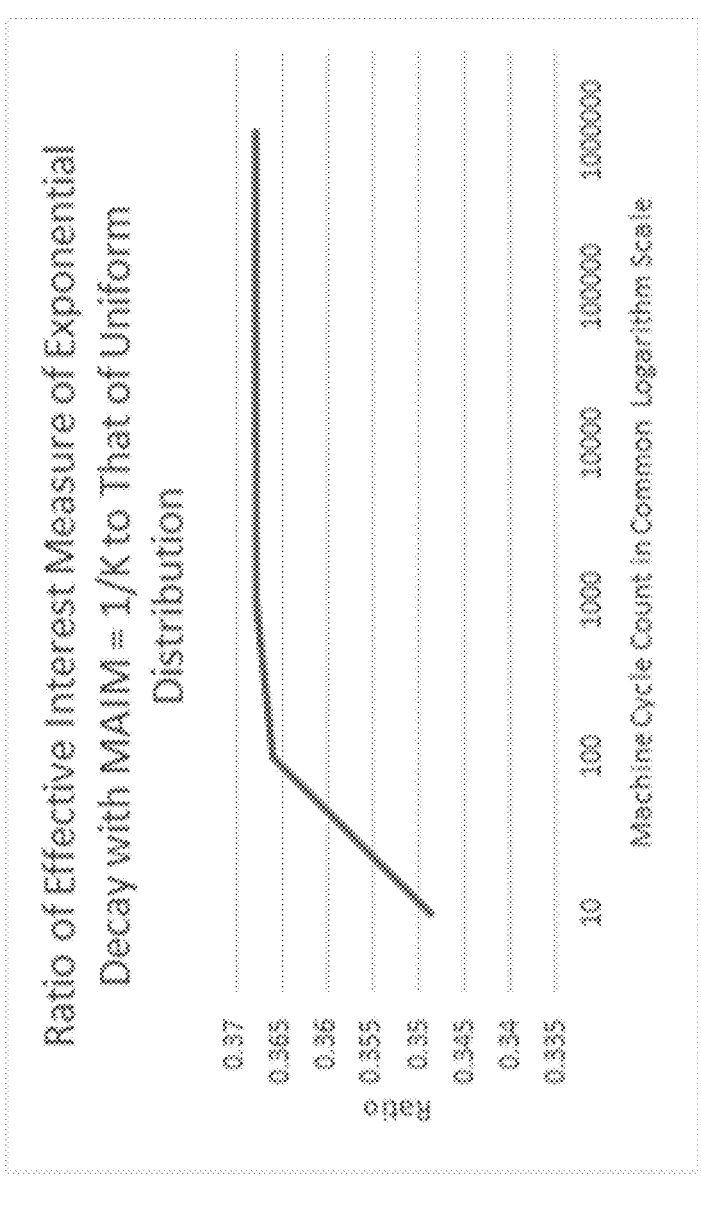
FIG. 2G is a graph illustrating an example, non-limiting embodiment of a Ratio of Effective Interest Measure for an Exponential Decay Model of Input Interest Measures at MAIM=1/K to that of a Uniform Distribution for a learning machine in accordance with various aspects described herein.

FIG. 2G is a graph illustrating an example, non-limiting embodiment of a Ratio of Effective Interest Measure for an Exponential Decay Model of Input Interest Measures at MAIM=1/K to that of a Uniform Distribution for a learning machine in accordance with various aspects described herein. In one or more embodiments, an exponential decay model can use a MAIM equal to 1/K (i.e., c=1/K), where K is a positive integer. At machine cycle count K prior to the current, the ratio of the effective interest measure of the exponential decay model with MAIM=1/K to that of the uniform distribution model over the most recent K input instances can be shown below.

$$\text{Effective Interest Measure} = \frac{c \times (1-c)^K}{c}$$

-continued $$= (1-c)^K$$

$$= \left(1 - \frac{1}{K}\right)^K$$

As K becomes indefinitely large, $$\lim_{K \to \infty} \left(1 - \frac{1}{K}\right)^K$$

$$= \lim_{K \to \infty} e^{K \times ln\left(1 - \frac{1}{K}\right)}$$

$$= \lim_{x \to 0} e^{\left\{\frac{ln(1-x)}{x}\right\}}$$

$$= e^{-1}$$

$$= 0.3678794$$

As a function of K, the ratio of the effective interest measure of the exponential decay model to that of the associated uniform distribution is illustrated in FIG. 2G.

Figure 2I:
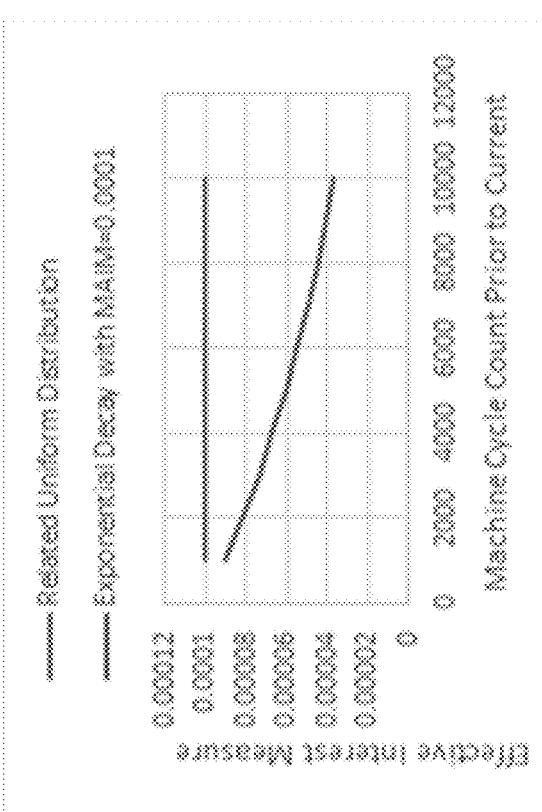
FIGS. 2H, and 2I are graphs illustrating examples of non-limiting embodiments comparing Effective Interest Measures for an Exponential Decay Model of Input Interest Measures at MAIM=0.01 and MAIM=0.0001 and Uniform Distributions for a learning machine in accordance with various aspects described herein.
Figure 2H:
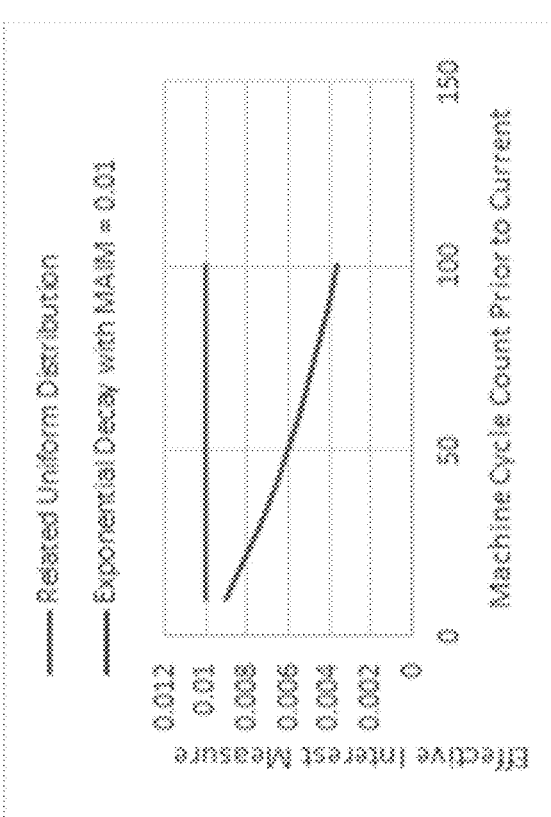

FIGS. 2H, and 2I are graphs illustrating examples of non-limiting embodiments comparing Effective Interest Measures for an Exponential Decay Model of Input Interest Measures at MAIM=0.01 and MAIM=0.0001 and Uniform Distributions for a learning machine in accordance with various aspects described herein. In one or more embodiments, the exponential decay model can use a MAIM of 1/K, where K is a positive integer greater than 10. It is found that the effective interest measure of any of the most recent K user input instances can always be between 1/K and 0.368× 1/K. Scale values of K=100 and of K=10000 can be compared as shown in FIGS. 2H and 2I. In summary, K is chosen as the scale of a machine such that the most recent K input instances shall be contributable meaningfully to an objective function, then $$\frac{1}{K}$$

can be chosen as MAIM.

In one or more embodiments, an effective intelligence level can be applied to autonomous components. An autonomous component in a learning machine M can refer to a subpart or a component of M that accepts an input instance and generates an output instance. For example, an artificial neural network that specializes in human facial recognition can be an autonomous component. For a given learning machine M, a training instance can refer to a quadruple set including an input instance i, a target output instance $o_t$, a user local interest $u_t$, and a target performance index $\lambda_t$, where the training instance is denoted by $[i, o_t, \varepsilon_t, \lambda_t]$. A machine M is said to have learned the training instance $[i, o_t, \varepsilon_t, \lambda_t]$ if the following conditions are met: $M(i) = o_t$ and $\lambda(i, M(i)) = \lambda_t$. For a given training instance $[i, o_t, \varepsilon_t, \lambda_t]$, assume a machine, $M_0$, initially does not "perform well" in response to the input instance i. In other words, the performance level is $\lambda(i, M_0(i)) = 0$. However, after successfully learning the input instance, the performance level of the learning machine can be improved to that of a "new" machine $M_1$ with $\lambda(i, M_1(i)) = \lambda_t$. Strictly speaking, learning a training instance can transform a machine M from $M_0$ to $M_1$. However, for the sake of clarity, M will be used to replace both $M_0$ and $M_1$.

In one or more elements, a machine M can include an autonomous component AC. AC may have learned a first training instance $[i_j, o_j, \varepsilon_j, \lambda_j]$ at machine cycle j, but may have never learned any other training instance before machine cycle j. In addition, the interest measure of the input $i_j$ can be $\varepsilon_j c$, where $\varepsilon_j$ can be a user local interest and c can be MAIM. In this scenario, the following two parameters are stored for the AC:

Intelligence Level at Last Update (ILLU)=$\lambda_j \varepsilon_j c$

Machine Cycle at Last Update (MCLU)=j

In other words, the intelligence level of the AC has been increased to ILLU at machine cycle count of MCLU.

In one or more embodiments, the same autonomous component AC can receive a second training instance $[i_k, o_k, \varepsilon_j, \lambda_k]$ at a later machine cycle k, where j<k. If the AC also learns this second training instance $i_k, o_k, \varepsilon_k, \lambda_k$, then the intelligence of component AC can now be assessed as:

ILLU=$\lambda_k \varepsilon_k c + \lambda_j \varepsilon_j c (1-c)^{k-j}$

MCLU=k

In general, by learning a new training instance $[i_k, o_k, \varepsilon_k, \lambda_k]$ at the current machine cycle CMC, the two intelligence parameters ILLU and MCLU of the AC are iteratively updated as follows:

ILLU=$\lambda_k \varepsilon_k c + ILLU \times (1-c)^{CMC-MCLU}$

MCLU=CMC

A closed form of an effective intelligence level of this AC is shown below:

$$EIL = \sum_{j=0}^{k} \left\{ \delta_j \lambda_j \varepsilon_j c (1-c)^{k-j} \right\}, \text{ where } \delta_j = 0 \text{ or } 1$$

In one or more embodiments, a given learning machine M can receive a test instance. The test instance can refer to a quadruple set of an input instance i, a target output instance $o_t$, a user interest $\varepsilon_t$, and a target performance index $\lambda_t$, denoted by $[i, o_t, \varepsilon_t, \lambda_t]$. The machine M can be said to have "passed" the test instance $[i, o_t, \varepsilon_t, \lambda_t]$ if the following conditions are met: $M(i) = o_t$ and $\lambda(i, M(i)) \geq \lambda_t$. Passing a test instance alone does not change the Intelligence Level at Last Update (ILLU). However, the test instance can update the Machine Cycle at Last Update (MCLU). By passing a test instance $[i_k, o_k, \varepsilon_k, \lambda_k]$, ILLU and MCLU of the autonomous component AC can be updated as follows:

ILLU=ILLU

MCLU=CMC

In one or more embodiments, by storing and updating ILLU and MCLU for each autonomous component AC, an effective intelligence level of each autonomous component can be computed at any future machine cycle. If an autonomous component AC learns a new training instance, its ILLU can be increased. The MCLU can also be updated with a new machine cycle. If an autonomous component AC has learned some training instances at earlier machine cycles but has not learned any new training instances in recent machine cycles, then the effective intelligence level can degrade as the machine cycle increases. In other words, the effective intelligent level can degrade by aging. In another scenario, if a test instance has just arrived at the autonomous component AC, and the AC has passed the test instance, then the MCLU can be updated. However, there is no need to update the ILLU. In one or more embodiments, test instances can be fed into an autonomous component AC, such that the AC can pass, and the intelligence level can avoid degradation by aging.

In one or more embodiments, a scenario can allow a user to differentiate input instances by interest measures. For example, in a learning machine application for computer security, advice from a security team member has a higher priority than that from a maintenance team member. The former team member deserves a higher interest measure.

In one or more embodiments, the MAIM can equal $10^{-5}$. Two autonomous components AC may have learned two training instances at machine cycles 1 and 5, respectively, and achieve a performance index $\lambda_j=1$ for j=1, 5. In this scenario, $i_1$ may be very important and $\varepsilon_1=1$ (e.g., the input instance is from the security team member). However, $i_5$ is not so important and $\varepsilon_5=0.6$ (e.g., the input instance is from the maintenance team member). As a result, the effective intelligence levels of $i_1$, $i_5$ at machine cycle 5 are 9.9996× $10^{-6}$ and $6\times10^{-6}$, respectively. Observe that the Intelligence Level of $i_5$ at machine cycle 5 is approximately 0.6 times that of apparently because of their different user local interest measures. This scenario is illustrated in Table 2, below:

TABLE 2

Assigning Different User Local Interest Measures to Differentiate Autonomous Components by User's Interests

| Machine cycle | | MAIM | Performance index λ | User interest ε | Intelligence level at MC = 5 |
|---|---|---|---|---|---|
| 1 | $i_1$ | 0.00001 | 1 | 1 | $9.9996 \times 10^{-6}$ |
| 2 | $i_2$ | | | | |
| 3 | $i_3$ | | | | |
| 4 | $i_4$ | | | | |
| 5 | $i_5$ | 0.00001 | 1 | 0.6 | $6 \times 10^{-6}$ |

FIG. 2J depicts an illustrative embodiment of a method 260 in accordance with various aspects described herein. At step 262, a learning machine can determine if a first input instance has been received at a first machine cycle, and, if so, then the learning machine can assign a first interest measure for the first input at step 264. At step 266, the learning machine can generate a first performance level based on the first input instance. At step 268, the learning machine can determine a first intelligence level based on a product of the first performance level and the first interest measure, and, at step 270, assign the first intelligence level as an initial intelligence level for the learning machine at the first cycle.

At step 272, the learning machine can determine if a subsequent input has been received at a subsequent cycle, and, if so, then the learning machine can reduce the first interest measure for the first input instance via an exponential decay, at step 274. At step 276, the learning machine can assign a subsequent interest measure to the subsequent input instance. At step 278, the learning machine can generate a subsequent performance level based on the subsequent input instance. At step 280, the learning machine can determine a subsequent intelligence level based on a product of the subsequent measure and the subsequent performance level. At step 282, the learning machine can assign the subsequent intelligence level as an updated intelligence level at the subsequent machine cycle.

While for purposes of simplicity of explanation, the respective processes are shown and described as a series of blocks in FIG. 2X, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
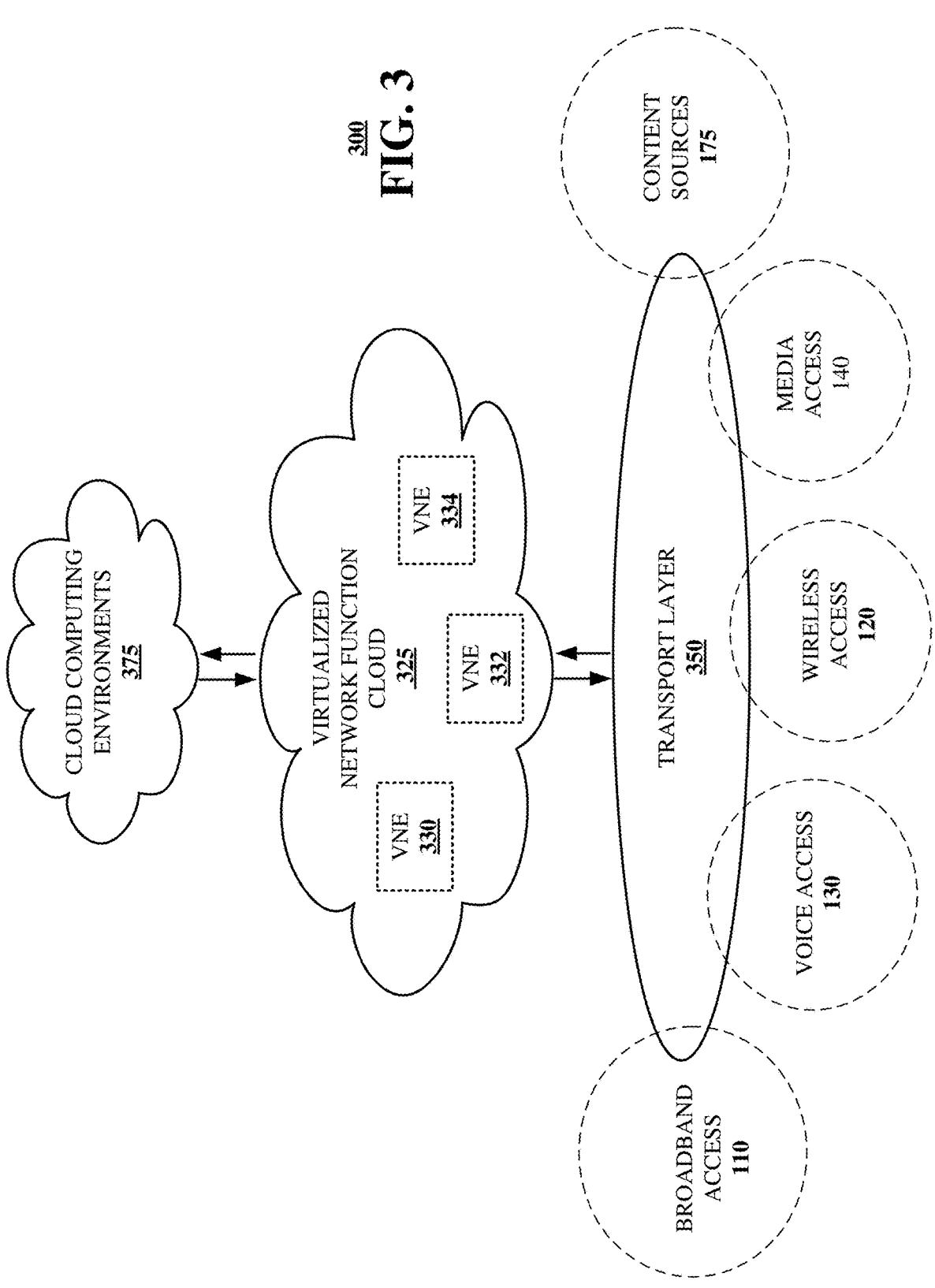
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, 2C, and 3. For example, virtualized communication network 300 can facilitate in whole or in part providing a learning machine capable of adapting to changes in input interest. An input, such as a training input, to a learning machine can be captured and assigned an interest measure. A performance level can be generated by the learning machine based on the input. An intelligence level for the learning machine can be determined based on a product of the performance level and the input interest measure. The interest level for the input can then be degraded, over subsequent input/cycles of the learning machine, using an exponential decay model. The exponential decay can be tailored to enable the learning machine to both retain a measure of the original intelligence level over a substantial number of machine cycles and to quickly respond to changes in input patterns.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements — which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
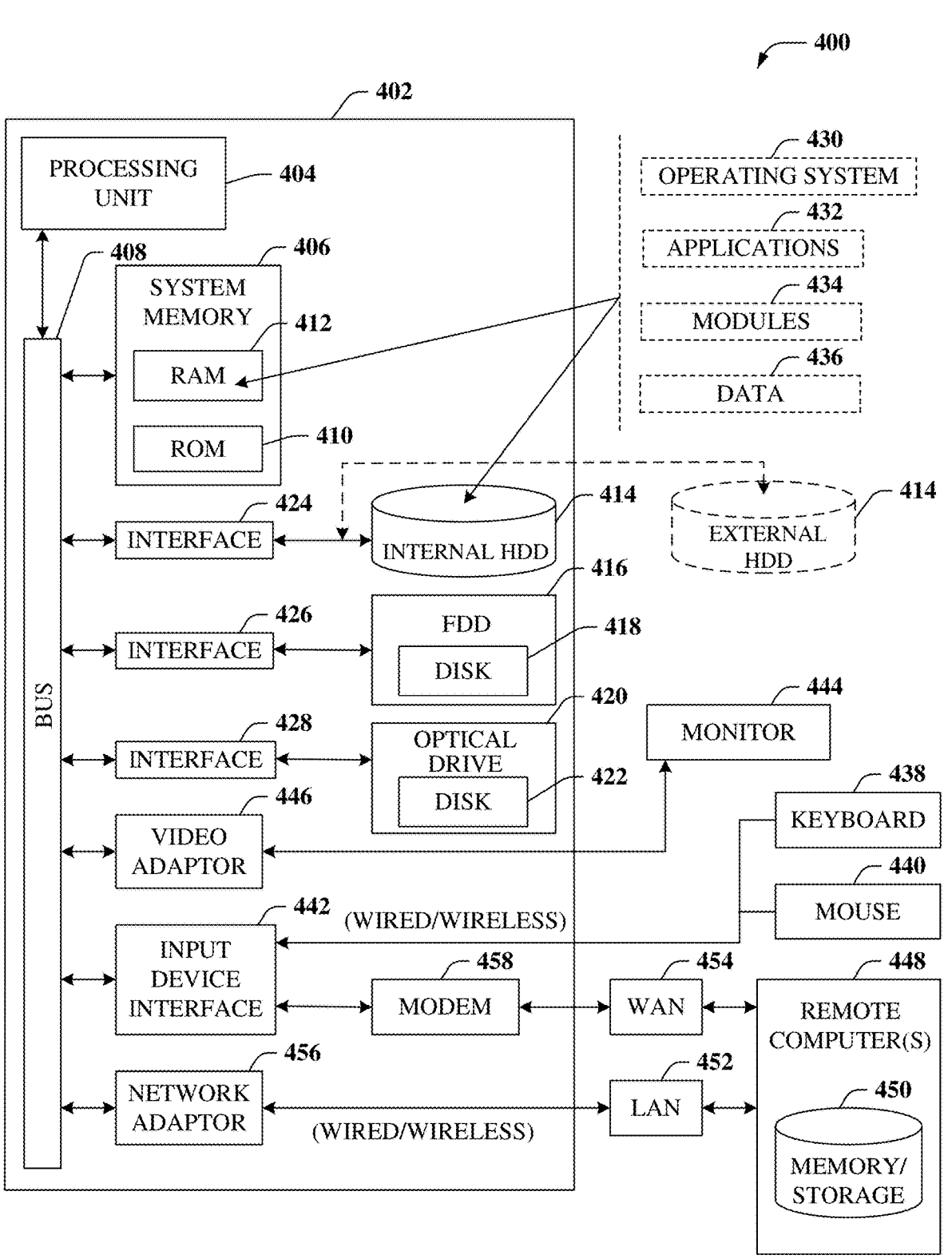
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs

330, 332, 334, etc. Each of these devices can be implemented via computer-executable instructions that can run on one or more computers, and/or in combination with other program modules and/or as a combination of hardware and software. For example, computing environment 400 can facilitate in whole or in part providing a learning machine capable of adapting to changes in input interest. An input, such as a training input, to a learning machine can be captured and assigned an interest measure. A performance level can be generated by the learning machine based on the input. An intelligence level for the learning machine can be determined based on a product of the performance level and the input interest measure. The interest level for the input can then be degraded, over subsequent input/cycles of the learning machine, using an exponential decay model. The exponential decay can be tailored to enable the learning machine to both retain a measure of the original intelligence level over a substantial number of machine cycles and to quickly respond to changes in input patterns.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM),flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
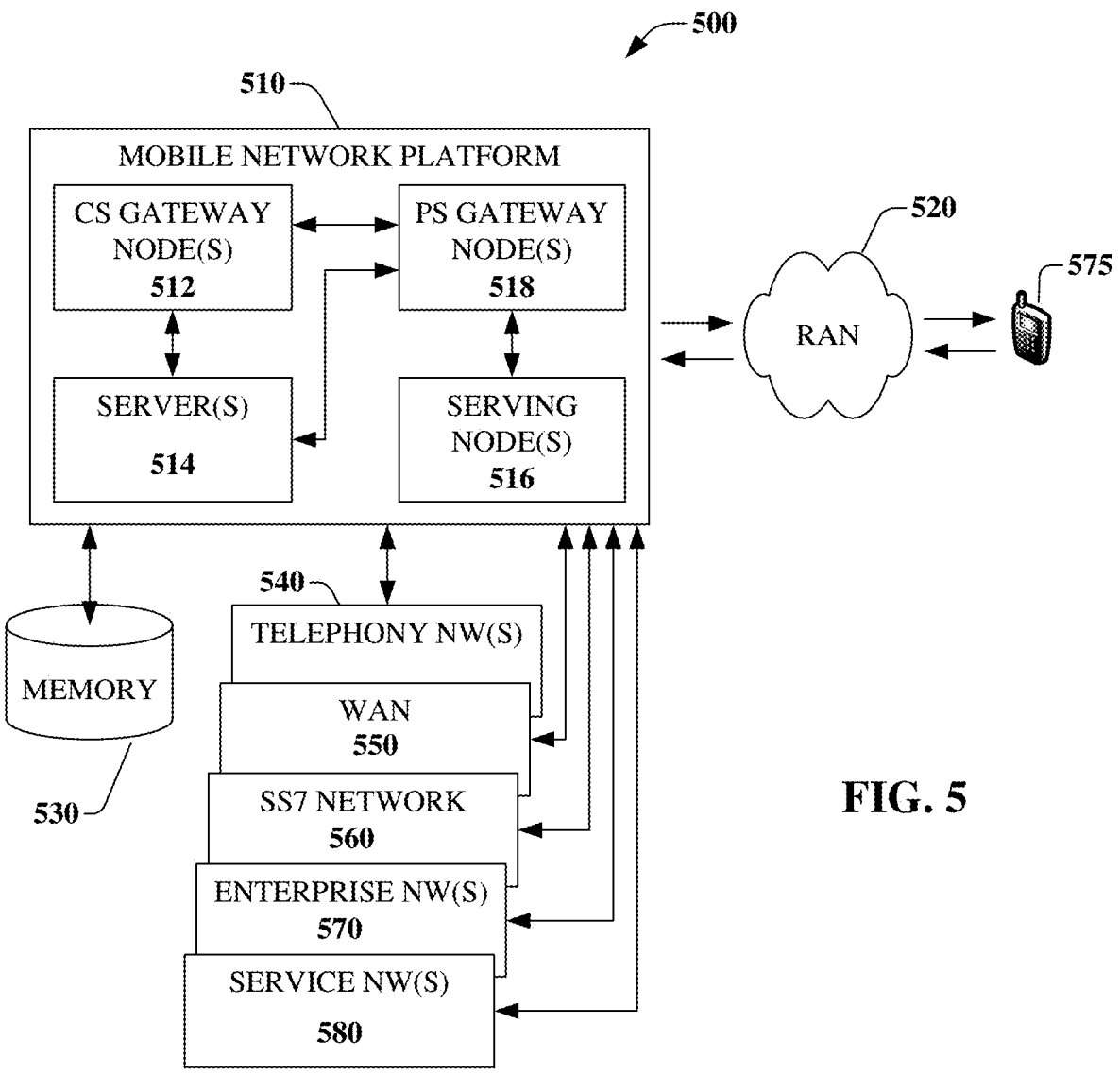
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing a learning machine capable of adapting to changes in input interest. An input, such as a training input, to a learning machine can be captured and assigned an interest measure. A performance level can be generated by the learning machine based on the input. An intelligence level for the learning machine can be determined based on a product of the performance level and the input interest measure. The interest level for the input can then be degraded, over subsequent input/cycles of the learning machine, using an exponential decay model. The exponential decay can be tailored to enable the learning machine to both retain a measure of the original intelligence level over a substantial number of machine cycles and to quickly respond to changes in input patterns.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
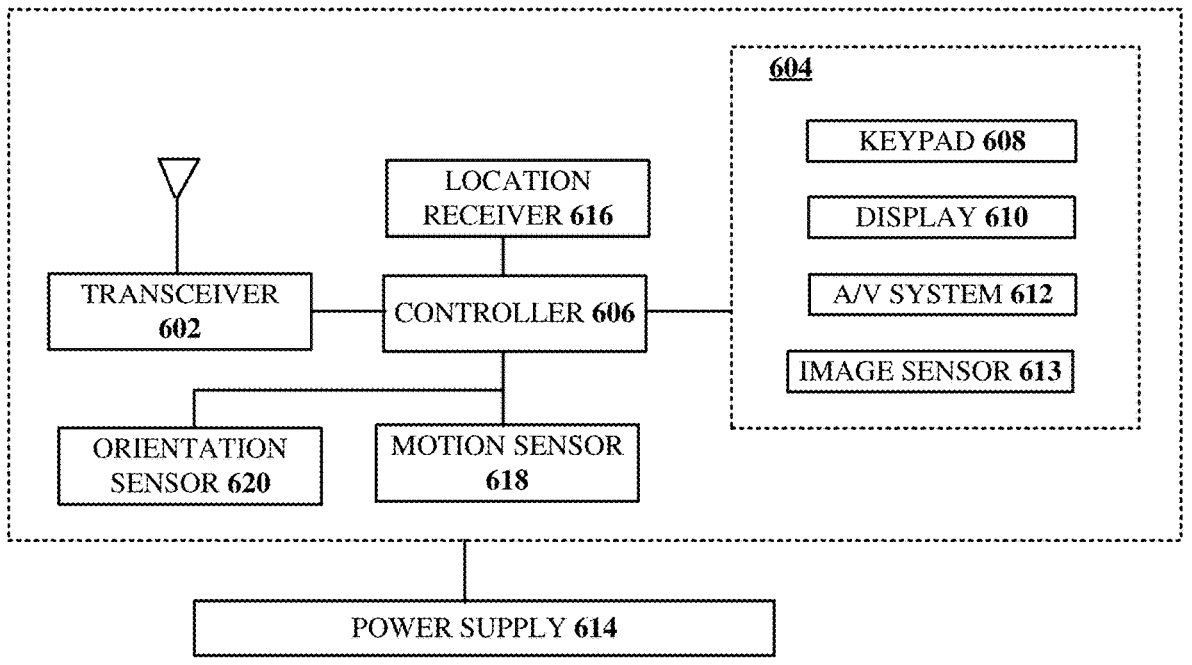
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part providing a learning machine capable of adapting to changes in input interest. An input, such as a training input, to a learning machine can be captured and assigned an interest measure. A performance level can be generated by the learning machine based on the input. An intelligence level for the learning machine can be determined based on a product of the performance level and the input interest measure. The interest level for the input can then be degraded, over subsequent input/cycles of the learning machine, using an exponential decay model. The exponential decay can be tailored to enable the learning machine to both retain a measure of the original intelligence level over a substantial number of machine cycles and to quickly respond to changes in input patterns.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

responsive to receiving, by a learning machine that controls a network surveillance dashboard, the learning machine including a processor, a first input at a first machine cycle of the learning machine, wherein each machine cycle comprises a discrete time interval during which the learning machine receives an input and processes the input:

assigning, by the learning machine, a first interest measure associated with the first input;

generating, by the learning machine, a first performance level of the learning machine according to the first input to the learning machine;

determining, by the learning machine, a first intelligence level of the learning machine according to a first product of the first interest measure and the first performance level, wherein the learning machine is adapted to optimize intelligence level; and assigning, by the learning machine, the first intelligence level as an initial intelligence level for the learning machine and the first machine cycle as a machine cycle at the initial intelligence level for the learning machine, wherein the first intelligence level does not identify a distributed denial of service (DDOS) attack, and the DDOS attack does not show up on the network surveillance dashboard; and responsive to receiving, by the learning machine, a subsequent input at a subsequent machine cycle of the learning machine, wherein the subsequent machine cycle occurs after the first machine cycle and is defined by receipt and processing of a new input by the learning machine:

reducing, by the learning machine, the first interest measure associated with the first input at the first machine cycle of the learning machine according to a total number of machine cycles of the learning machine that have occurred since the first machine cycle, wherein the reducing comprises applying an exponential decay model to the first interest measure to produce an effective interest measure, the exponential decay model being defined by:

$$\mu_j = \varepsilon_j c (1-c)^{k-j}$$

wherein $\mu_j$ is the effective interest measure for the first input at the subsequent machine cycle, $\varepsilon_j$ is a user local interest value for the first input, c is a maximum available interest measure (MAIM), k is the subsequent machine cycle, and i is the first machine cycle;

assigning, by the learning machine, a subsequent interest measure to the subsequent input at the subsequent machine cycle of the learning machine;

generating, by the learning machine, a subsequent performance level of the learning machine according to the subsequent input to the learning machine; and determining, by the learning machine, a subsequent intelligence level of the learning machine according to a sum of a second product of the subsequent interest measure and the subsequent performance level and a third product of the effective interest measure and the first performance level, wherein the subsequent intelligence level does identify the DDOS attack and the DDOS attack does show up on the network surveillance dashboard.

2. The method of claim 1, wherein the reducing the first interest measure associated with the first input at the first machine cycle of the learning machine further comprises applying an exponential decay to the first interest measure according to the total number of cycles of the learning machine that have occurred since the first machine cycle.

3. The method of claim 2, wherein the first input is a training input for the learning machine, and wherein the subsequent input is a subsequent training input to the learning machine.

4. The method of claim 1, wherein the first interest measure is proportional to a total interest available for inputs to the learning machine.

5. The method of claim 1, wherein the subsequent interest measure is proportional to a total interest available.

6. The method of claim 1, wherein the first interest measure is proportional to a maximum available interest measure for the learning machine, and wherein the subsequent interest measure is proportional to the maximum available interest measure for the machine.

7. The method of claim 6, wherein the maximum available interest measure for the learning machine comprises a long-term interest associated with the learning machine, and wherein the first interest measure comprises a short-term interest associated with a user of the learning machine.

8. The method of claim 1, wherein the assigning the first interest measure further comprises weighting the first interest measure according to a user choice.

9. The method of claim 8, wherein the weighting the first interest measure is further according to a severity category.

10. The method of claim 8, wherein the weighting the first interest measure is further according to textual expression of a user.

11. The method of claim 1, further comprising assigning, by the learning machine, the subsequent intelligence level as an updated intelligence level for the learning machine and the subsequent machine cycle as a machine cycle at the updated intelligence level for the learning machine.

12. A learning machine that controls a network surveillance dashboard, comprising:

a processing system including a processor; and a memory that stores executable instructions that, when executed by the processing system, facilitate performance of operations, the operations comprising:

assigning a first interest measure associated with a first input to the learning machine at a first machine cycle of the learning machine, wherein each machine cycle comprises a discrete time interval during which the learning machine receives an input and processes the input;

generating a first performance level of the learning machine according to the first input to the learning machine;

determining a first intelligence level of the learning machine according to a first product of the first interest measure and the first performance level, wherein the learning machine is adapted to optimize intelligence level, wherein the first intelligence level does not identify a distributed denial of service (DDOS) attack, and the DDOS attack does not show up on the network surveillance dashboard; and responsive to receiving a subsequent input at a subsequent machine cycle of the learning machine, wherein the subsequent machine cycle occurs after the first machine cycle and is defined by receipt and processing of a new input by the learning machine:

reducing the first interest measure associated with the first input at the first machine cycle of the learning machine according to a total number of machine cycles of the learning machine that have occurred since the first machine cycle, wherein the reducing comprises applying an exponential decay model to the first interest measure to produce an effective interest measure, the exponential decay model being defined by:

$$\mu_j = \varepsilon_j c(1-c)^{k-j}$$

wherein $\mu_j$ is the effective interest measure for the first input at the subsequent machine cycle, $\varepsilon_j$ is a user local interest value for the first input, c is a maximum available interest measure (MAIM), k is the subsequent machine cycle, and j is the first machine cycle;

assigning a subsequent interest measure to the subsequent input at the subsequent machine cycle of the learning machine;

generating a subsequent performance level of the learning machine according to the subsequent input to the learning machine; and determining a subsequent intelligence level of the learning machine according to a sum of a second product of the subsequent interest measure and the subsequent performance level and a third product of the effective interest measure and the first performance level, wherein the subsequent intelligence level does identify the DDOS attack and the DDOS attack does show up on the network surveillance dashboard.

13. The learning machine of claim 12, wherein the operations further comprise:

assigning the first intelligence level as an initial intelligence level for the learning machine and the first machine cycle as the machine cycle at the initial intelligence level for the learning machine; and assigning the subsequent intelligence level as an updated intelligence level for the learning machine and the subsequent machine cycle as a machine cycle at the updated intelligence level for the learning machine.

14. The learning machine of claim 12, wherein the reducing the first interest measure associated with the first input at the first machine cycle of the learning machine further comprises applying an exponential decay to the first interest measure according to the total number of machine cycles of the learning machine that have occurred since the first machine cycle.

15. The learning machine of claim 12, wherein the first input is a training input for the learning machine, and wherein the subsequent input is a subsequent training input to the learning machine.

16. The learning machine of claim 12, wherein the first interest measure is proportional to a maximum available interest measure for the learning machine, wherein the subsequent interest measure is proportional to the maximum available interest measure for the machine.

17. The learning machine of claim 16, wherein the maximum available interest measure for the learning machine comprises a long-term interest associated with the learning machine, and wherein the first interest measure comprises a short-term interest associated with a user of the learning machine.

18. The learning machine of claim 12, wherein the assigning the first interest measure further comprises weighting the first interest measure according to a severity category, a textual expression of a user, or a combination thereof.

19. A non-transitory machine-readable medium, comprising executable instructions that, when executed by a processing system including a processor, facilitate performance of operations at a learning machine, the operations comprising:

assigning a first interest measure associated with a first input to the learning machine at a first machine cycle of the learning machine, wherein the learning machine controls a network surveillance dashboard, wherein each machine cycle comprises a discrete time interval during which the learning machine receives an input and processes the input;

determining a first intelligence level of the learning machine according to a first product of the first interest measure and a first performance level of the learning machine based on the first input to the learning machine, wherein the learning machine is adapted to optimize intelligence level, wherein the first intelligence level does not identify a distributed denial of service (DDOS) attack, and the DDOS attack does not show up on the network surveillance dashboard; and responsive to receiving a subsequent input at a subsequent machine cycle of the learning machine, wherein the subsequent machine cycle occurs after the first machine cycle and is defined by receipt and processing of a new input by the learning machine:

reducing the first interest measure associated with the first input at the first machine cycle of the learning machine according to a total number of machine cycles of the learning machine that have occurred since the first machine cycle, wherein the reducing comprises applying an exponential decay model to the first interest measure to produce an effective interest measure, the exponential decay model being defined by:

$$\mu_j = \varepsilon_j c (1-c)^{k-j}$$

wherein $\mu_j$ is the effective interest measure for the first input at the subsequent machine cycle, $\varepsilon_j$ is a user local interest value for the first input, c is a maximum available interest measure (MAIM), k is the subsequent machine cycle, and j is the first machine cycle;

assigning a subsequent interest measure to the subsequent input at the subsequent machine cycle of the learning machine;

generating a subsequent performance level of the learning machine according to the subsequent input to the learning machine; and determining a subsequent intelligence level of the learning machine according to a sum of a second product of the subsequent interest measure and a subsequent performance level of the learning machine based on the subsequent input to the learning machine, wherein the subsequent intelligence level does identify the DDOS attack and the DDOS attack does show up on the network surveillance dashboard.

20. The non-transitory machine-readable medium of claim 19, wherein the reducing the first interest measure associated with the first input at the first machine cycle of the learning machine further comprises applying an exponential decay to the first interest measure according to the total number of cycles of the learning machine that have occurred since the first machine cycle.

* * * * *